(12) United States Patent
Green et al.

(10) Patent No.: US 7,051,612 B2
(45) Date of Patent: May 30, 2006

(54) STEERING COLUMN ASSEMBLY FOR A VEHICLE

(75) Inventors: Stephen Paul Green, Strophire (GB); Richard James Peel, Warwick (GB); Matthew Craig Williams, Coventry (GB)

(73) Assignee: NSK Steering Systemes Europe Limited, Nottinghamshire (GB)

( * ) Notice: Subject to any disclaimer, the term of this patent is extended or adjusted under 35 U.S.C. 154(b) by 75 days.

(21) Appl. No.: 09/987,024

(22) Filed: Nov. 13, 2001

(65) Prior Publication Data

US 2002/0059847 A1    May 23, 2002

(30) Foreign Application Priority Data

Nov. 14, 2000  (GB) .................. 0027767.3

(51) Int. Cl.
*B62D 1/18*    (2006.01)
(52) U.S. Cl. ........................... 74/493; 280/777
(58) Field of Classification Search ............ 74/492, 74/493; 280/777, 779
See application file for complete search history.

(56) References Cited

U.S. PATENT DOCUMENTS

| | | | | |
|---|---|---|---|---|
| 3,590,655 A | * | 7/1971 | Farrell et al. ............ | 74/492 |
| 3,788,148 A | * | 1/1974 | Connell et al. ........... | 74/492 |
| 4,465,301 A | * | 8/1984 | Bongers et al. ........... | 280/777 |
| 4,867,003 A | * | 9/1989 | Beauch et al. ........... | 280/777 |
| 4,886,295 A | * | 12/1989 | Browne .................. | 280/777 |
| 5,086,661 A | * | 2/1992 | Hancock ................. | 74/493 |
| 5,813,794 A | * | 9/1998 | Castellon ............... | 280/777 |
| 6,015,350 A | * | 1/2000 | Breese .................. | 280/777 |

FOREIGN PATENT DOCUMENTS

| DE | 35 36 285 | 4/1987 |
|---|---|---|
| DE | 691 06 626 | 5/1995 |
| DE | 695 04 389 | 1/1999 |
| EP | 0 611 690 | 8/1994 |
| EP | 0 718 172 | 6/1996 |
| GB | 2 278 665 | 12/1994 |
| GB | 2 343 157 | 5/2000 |

* cited by examiner

*Primary Examiner*—David Fenstermacher
(74) *Attorney, Agent, or Firm*—Miles & Stockbridge P.C.

(57) ABSTRACT

A steering column assembly for a vehicle includes upper and lower column assemblies and a central collapsible steering column drive shaft mounted in upper and lower bearings and a central bearing comprising a cylindrical plastics tube that surrounds the central steering column drive shaft and is slidably mounted in the upper column assembly and rotatably supports the central collapsible steering column drive shaft at its lower end.

17 Claims, 3 Drawing Sheets

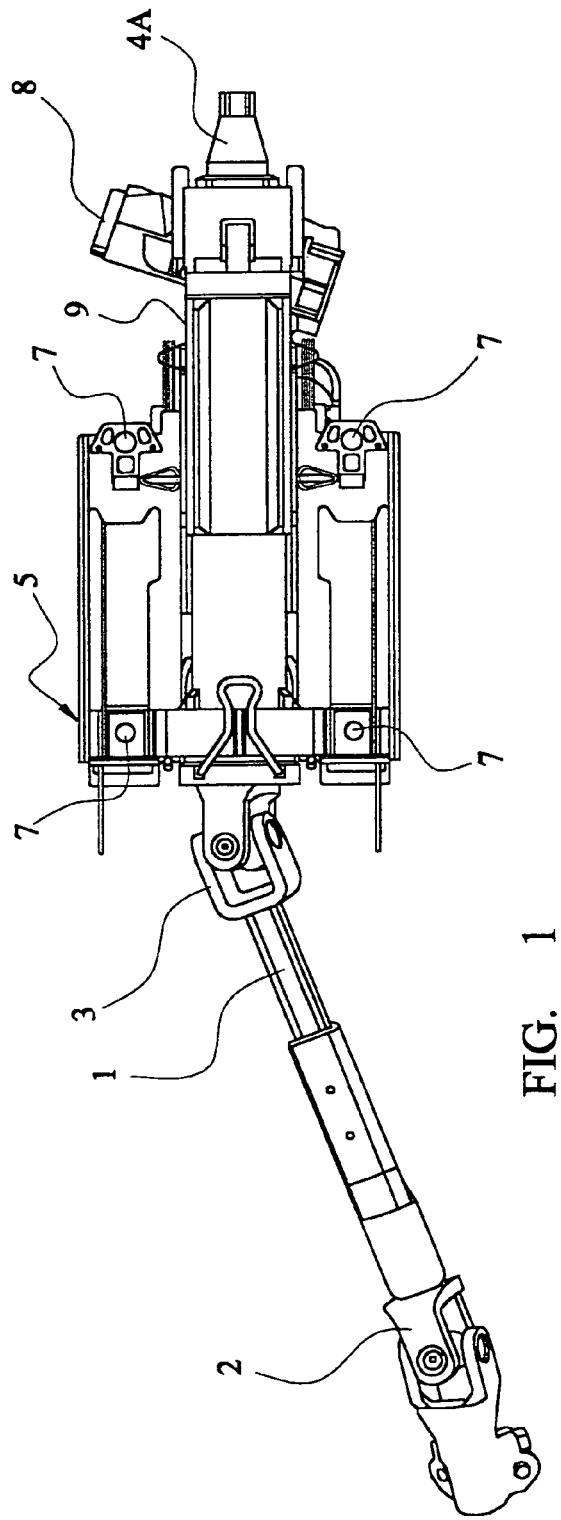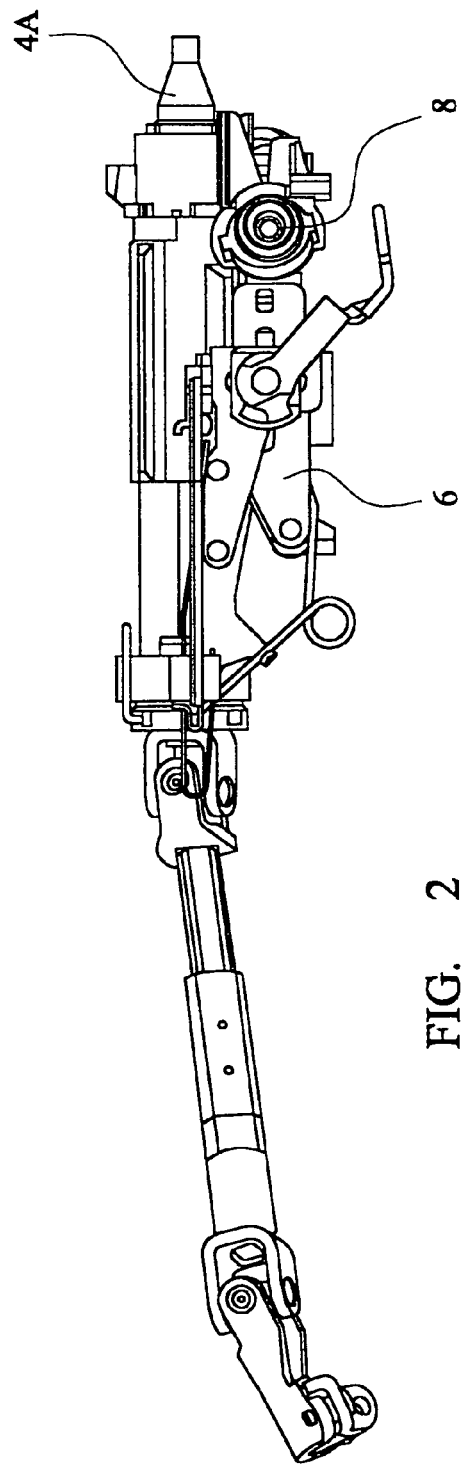
FIG. 1
FIG. 2

STEERING COLUMN ASSEMBLY FOR A VEHICLE

BACKGROUND OF THE INVENTION

This invention relates to a steering column assembly for vehicle and in particular relates to a bearing arrangement for a rake and reach adjustable steering column.

SUMMARY OF THE INVENTION

According to the present invention, there is provided a steering column assembly for a vehicle, including an upper column assembly, a lower column assembly and a central collapsible steering column passing through the upper and lower column assemblies; there being a central bearing comprising a cylindrical cube that surrounds said central collapsible steering column, that is slidably mounted in said upper column assembly and that rotatably supports said central collapsible steering column at its lower end.

The central bearing may be made of a plastics material.

The central bearing may be a molded thermoplastics tube.

The plastics tube may be a molded glass or carbon fiber-filled thermoplastics tube.

The steering column assembly can be rake and/or reach adjustable.

BRIEF DESCRIPTION OF THE DRAWINGS

For a better understanding of the invention and to show how the same may be carried into effect, reference will now be made, by way of example, to the accompanying drawings, in which:

FIG. 1 is a diagrammatic plain view of part of a steering column assembly for a vehicle;

FIG. 2 is a side view of the assembly shown in FIG. 1;

DESCRIPTION OF THE PREFERRED EMBODIMENT

Figure 3:
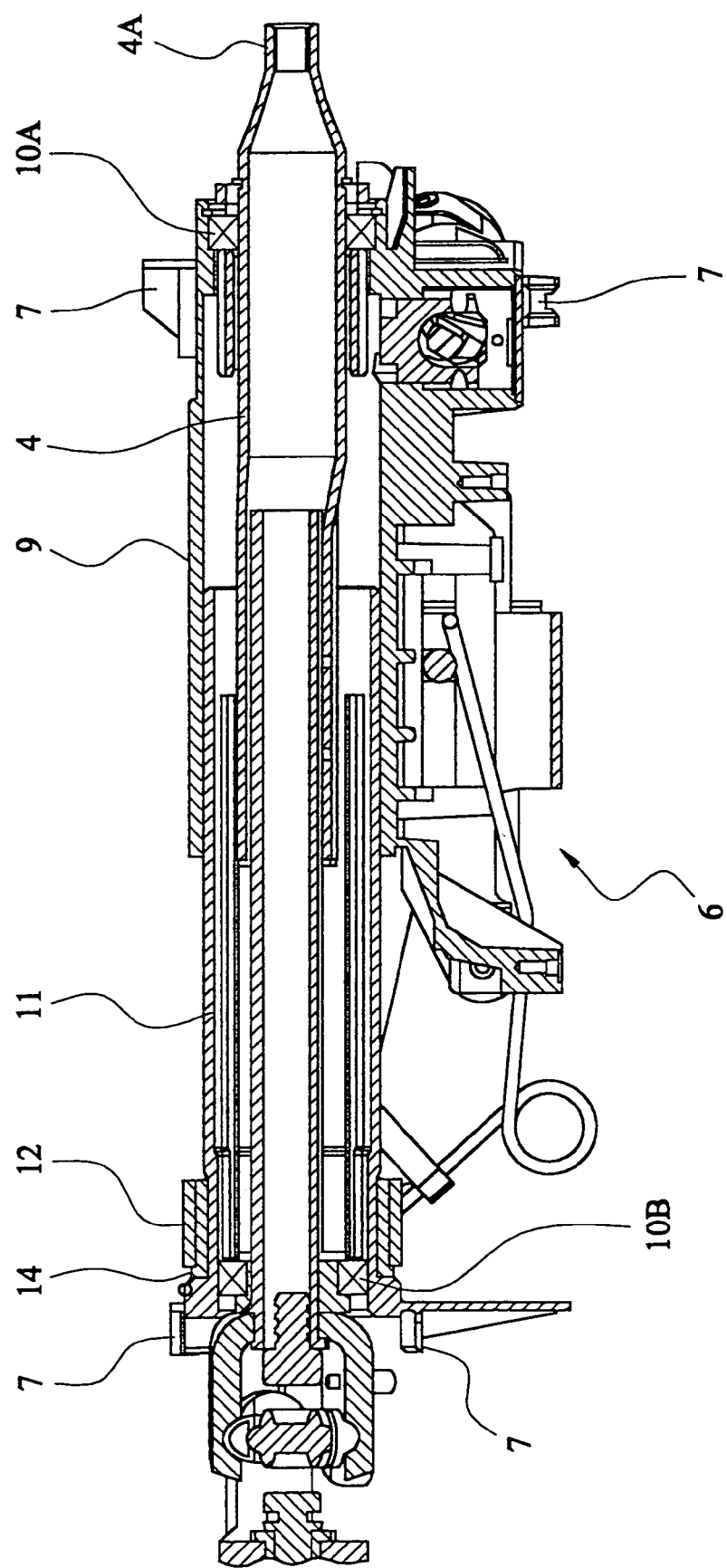
FIG. 3 is a longitudinal sectional view of part of the assembly shown in FIGS. 1 and 2.
Figure 4:
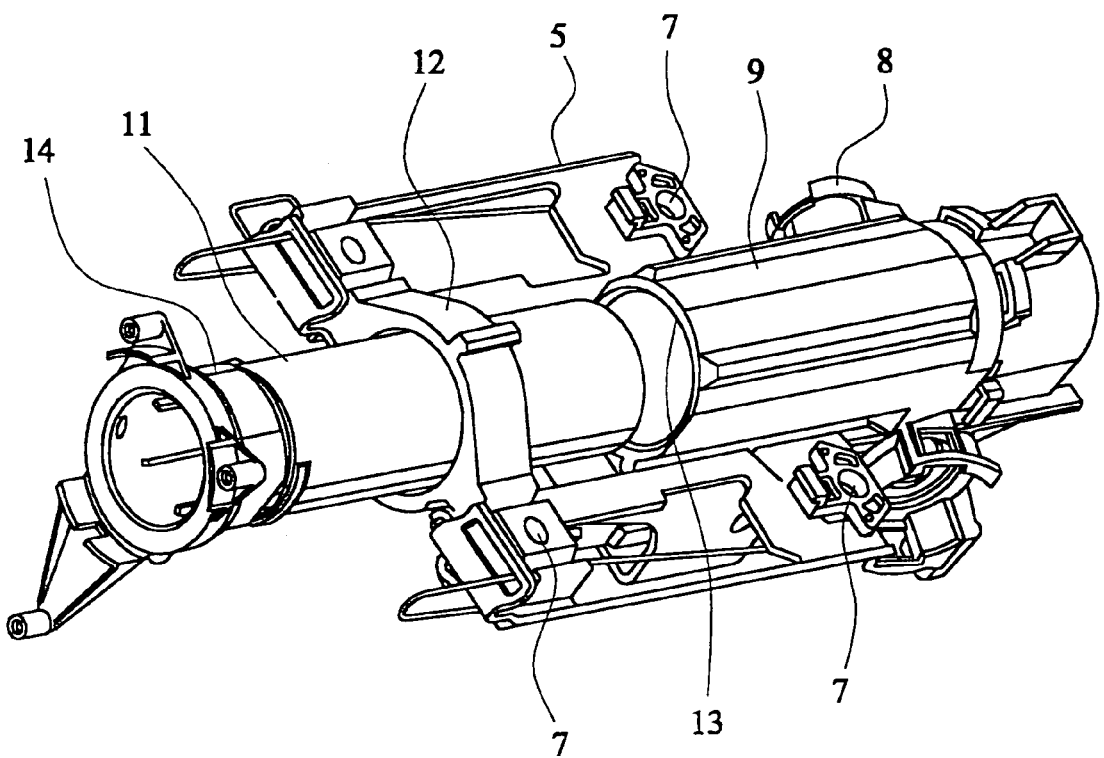
FIG. 4 is an exploded perspective view of part of the assembly shown in FIGS. 1 to 3.
Figure 5:
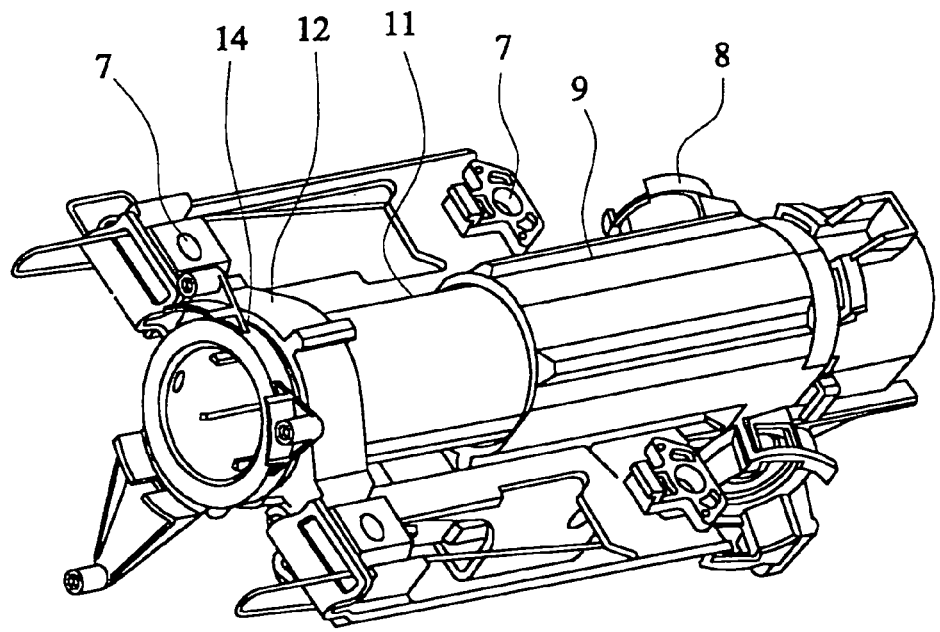
FIG. 5 is a perspective assembled view of that part of the assembly shown in FIG. 4.

Referring to the drawings, the steering column assembly includes an intermediate steering drive shaft 1 for connection at its lower end to a universal joint 2 with a lower steering shaft (not shown), the intermediate drive shaft 1 being coupled through a universal joint 3 at its upper end to a central drive shaft 4 that passes through a steering column mounting bracket 5. The upper end 4A of the central drive shaft 4, remote from the universal joint 3, has means for mounting a steering wheel (not shown) on it.

The central drive shaft 4 is rake and/or reach adjustable by means of an adjustment assembly 6 including a clamping mechanism.

The steering column mounting bracket is mounted at locations 7 to a vehicle cross car beam (not shown) FIGS. 1 and 2 also show a top lock assembly 8 to which the adjusting assembly 6 is mounted. The top lock assembly 8 includes a cylindrical lock housing bore 9.

The central drive shaft 4 is also arranged to be collapsible in the event of vehicle crash and is mounted in two rotary bearings 10A and 10B (FIG. 3) each connecting the central drive shaft 4 to the upper and lower mounting members 7 of the mounting bracket 5.

An axially concentric tube-in-tube slidable center bearing system is provided which allows static/dynamic axial displacement of the lower mounting bracket mounting relative to the upper mounting bracket mounting for driver-initiated reach adjustment of the steering shaft and wheel assembly and dynamic ride-down displacement top towards bottom in the event of a vehicle (head-on) crash.

The present steering column assembly includes a slidable center bearing construction in the upper steering column assembly which comprises a cylindrical tube 11 of plastics material such as a thermo-molded plastics acetal material which is flexibly attached to a lateral mounting bracket 12 at a lower end of the mounting bracket 5 and is axially located in, and slidably through, a bore 13 of the lock housing assembly 9 at the upper end of the mounting bracket 5. The tube 11 may alternatively be made from a glass or carbon-fiber-filled plastics acetal medium in order to obtain an enhanced bending stiffness from increase in the modular elasticity leading to a higher natural frequency of vibration for the steering column. Since the tube 11 is of plastics material, it can be precision molded so as to allow the component readily to make an operational slide fit within the bore 13 (which is machined) of the housing of the lock assembly 9.

Furthermore, the material of the plastics tube 11 allows for a natural lubrication effect leading to a relatively low co-efficient of surface friction which assists in the provision of a low static breakaway and column ride-down force in the event of vehicle crash. It also accordingly has a low density when compared with conventional metallic materials, which provides weight reduction benefit.

A bush liner 14 is provided to fit about the lower end of the plastics tube 11, the liner upon assembly fitting within the lateral mounting bracket 12 of the mounting bracket 5.

We claim:

1. A steering column assembly for a vehicle, comprising an upper column assembly, a lower column assembly, and a central collapsible steering shaft passing through the upper and lower column assemblies, there being a central bearing including a cylindrical first tube of plastics material that surrounds said central collapsible steering shaft, that is slidably mounted in a bore of a second tube of said upper column assembly with an outer peripheral surface of said first tube being in slidable contact with an inner peripheral surface of said bore, and that rotatably supports said central collapsible steering shaft at a lower end of said first tube.

2. An assembly according to claim 1, wherein said bore of said second tube is a machined.

3. An assembly according to claim 1, wherein said first tube is a molded thermoplastics tube.

4. An assembly according to claim 1, wherein said first tube is a molded glass fiber-filled thermoplastics tube.

5. An assembly according to claim 1, wherein said first tube is a molded carbon-fiber-filled thermoplastics tube.

6. An assembly according to claim 1, and being rake adjustable.

7. An assembly according to claim 1, and being reach adjustable.

8. An assembly according to claim 1, wherein said lower end of said first tube is supported by a mounting bracket portion through a bush liner fitted about said lower end of said first tube.

9. An assembly according to claim 8, wherein said lower end of said first tube is supported in a bore of said mounting bracket portion through said bush liner.

10. A steering column assembly for a vehicle, comprising an upper column assembly, a lower column assembly, and a collapsible steering shaft extending within the upper and lower column assemblies, there being a central bearing including a cylindrical tube of plastics material that surrounds said central collapsible steering shaft, that is axially slidably mounted in a machined bore of said upper column assembly with an outer peripheral surface of said tube in slidable contact with an inner peripheral surface of said bore, said central collapsible steering shaft being rotatably supported to a lower end of said tube through a first rotary bearing and to said upper steering column assembly through a second rotary bearing.

11. An assembly according to claim 10, wherein said tube is a molded carbon-fiber-filled thermoplastics tube.

12. An assembly according to claim 10, and being rake adjustable.

13. An assembly according to claim 10, and being reach adjustable.

14. An assembly according to claim 10, wherein said tube is a molded thermoplastics tube.

15. An assembly according to claim 10, wherein said tube is a molded glass fiber-filled thermoplastics tube.

16. An assembly according to claim 10, wherein said lower end of said tube is supported by a mounting bracket portion through a bush liner fitted about said lower end of said tube.

17. An assembly according to claim 16, wherein said lower end of said tube is supported in a bore of said mounting bracket portion through said bush liner.

* * * * *